Oct. 31, 1967  E. L. SCHIAVONE  3,350,583
ELECTRIC POWER SUPPLY
Filed Nov. 13, 1963
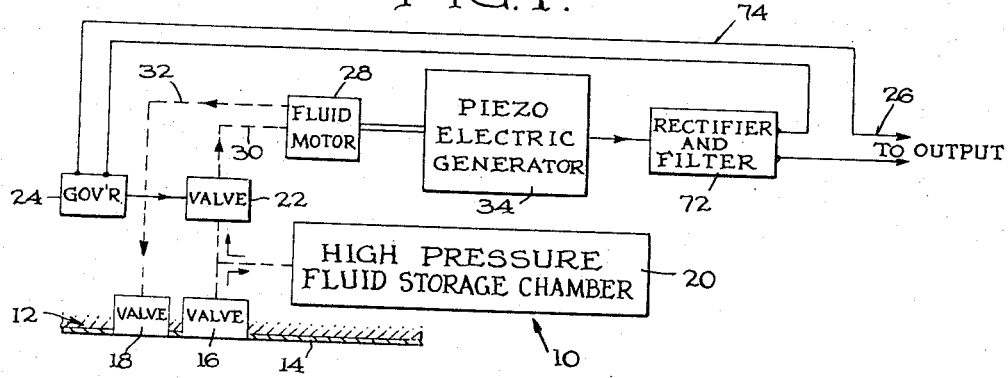
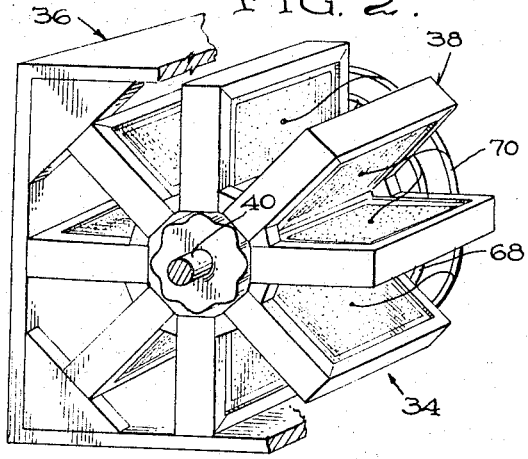
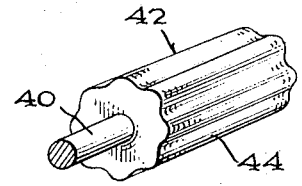
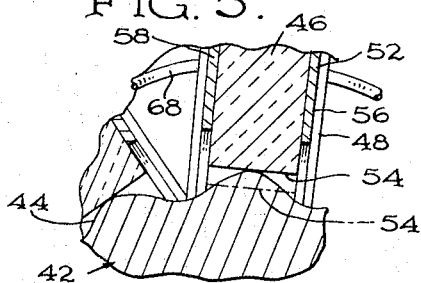
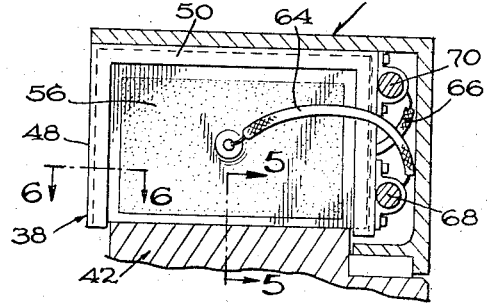
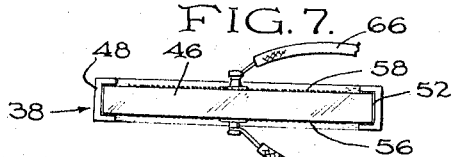
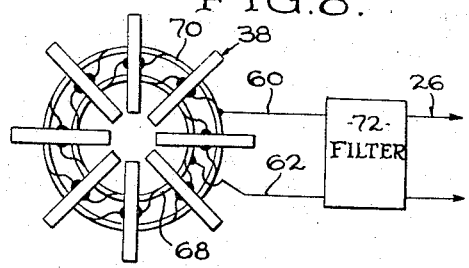
INVENTOR
EDWARD L. SCHIAVONE
BY JACOB SHUSTER
ATTORNEY

United States Patent Office 3,350,583
Patented Oct. 31, 1967

3,350,583
ELECTRIC POWER SUPPLY
Edward L. Schiavone, 10502 Insley St.,
Silver Spring, Md. 20902
Filed Nov. 13, 1963, Ser. No. 323,384
13 Claims. (Cl. 310—8.3)

This invention relates to rechargeable power supplies in general and in particular to reliable power sources of reduced bulk and weight for electrical loads such as instrumentation in vehicles of different types including underwater craft, surface craft, airborne craft, missiles and satellite vehicles.

It is therefore an important object of the present invention to provide apparatus capable of storing energy and controllably releasing said energy at a low rate for prolonged generation of electrical power in accordance with a continuous demand.

Another object of the present invention is to convert stored energy into electrical energy in a reliable and efficient manner so as to meet the power demands of electrical loads without any large, bulky, and heavy equipment having recharging facilities.

A further object of the present invention is to provide a system for storing and controllably releasing energy in accordance with the condition of the energy storage facility and the vehicle environment to produce a substantially constant electrical power output for a prolonged period of time.

In accordance with the foregoing objects, an additional object of the present invention is to provide a novel generator of the piezoelectric type capable of producing the requisite power output at a relatively low driven speed.

Yet another object is to provide a system for converting stored energy into electrical energy under low operating temperatures without development of noxious waste gases or fluid so as to render the system safe and compatible with environmental conditions that make such attributes critically necessary.

The foregoing and other objects and advantages of the invention will be apparent from the following description and from the accompanying drawings in which:

FIGURE 1 is a schematic block diagram illustrating the system of the present inveniton;

FIGURE 2 is a perspective view of the piezoelectric generator with parts broken away;

FIGURE 3 is a perspective view of the driver cam element of the generator;

FIGURE 4 is a partial side sectional view of the generator substantially through a radial plane;

FIGURE 5 is an enlarged partial sectional view taken substantially through a plane indicated by section line 5—5 in FIGURE 4;

FIGURE 6 is an enlarged partial sectional view taken substantially through a plane indicated by section line 6—6 in FIGURE 4;

FIGURE 7 is a top plan view of one of the piezoelectric units of the generator; and FIGURE 8 is an electrical circuit diagram corresponding to the generator.

Referring to the drawings in detail, FIGURE 1 diagrammatically illustrates a power supply generally referred to by reference numeral 10 adapted to be mounted within any suitable vehicle as aforementioned, the vehicle being denoted by reference numeral 12 and having an outer skin or surface 14 through which a filler valve assembly 16 is exposed for purposes to be hereafter explained. Also exposed through the outer surface and hence subject to the ambient pressure of the fluid medium in which the vehicle travels, is a discharge valve assembly 18.

With continued reference to FIGURE 1, it will be observed that the vehicle mounts therewithin as part of the power supply 10, a fluid storage chamber 20 to which the filler valve assembly 16 is connected for charging the chamber with any suitable fluid such as air or an inert gas where this is advisable or required as a safety precaution against undesirable chemical reactions because of fluid leakage from the system. Filler valve assemblies for charging pressure chambers with gas are well known so that any suitable type could be used as the valve assembly 16 for the indicated purpose, the valve assembly being operative to close when the chamber 20 is fully charged and then permit outflow of fluid therefrom at a controlled rate of flow through the flow restricting valve assembly 22.

The flow restricting valve assembly is also a well known device, the details of which form no part of the present invention, which may be variably controlled to regulate the flow rate therethrough and thereby regulate the release of fluid and pressure energy from the fluid storage chamber 20. The opening in the flow restricting valve assembly is therefore controlled by a current responsive governor 24 of any well known type operative to vary the flow rate of fluid in accordance with the output current in power lines 26 of the power supply 10 to which the electrical loads are connected. The flow restricting valve assembly 22 is thereby rendered operative to regulate the speed of a fluid motor 28 in order to maintain a constant power output from the power supply.

The fluid motor 28 is of any well known type through which fluid under pressure is circulated to produce motive energy. As is well known, the output of the fluid motor depends upon the pressure differential between its inlet 30 and its outlet 32. The inlet pressure will depend on the load on the motor 28, the flow opening in the flow restricting valve assembly 22 and the outlet pressure condition of the chamber 20. Accordingly, the reduction of the pressure in the chamber 20 as the fluid stored therein is exhausted, is accompanied by an increase in the opening of the flow restricting valve assembly 22 tending to maintain the pressure differential at a regulated value. The pressure differential will, of course, also depend upon the pressure in outlet 32 which is connected to the discharge valve assembly 18. Fluid from motor 28 may therefore be discharged against the ambient pressure of the fluid medium so that the outlet pressure will be some function thereof. In this way, advantage may be taken of a reduction in the ambient pressure of the environment to reduce the discharge of fluid from chamber 20, inasmuch as the flow restricting valve assembly 22 is operative to maintain the regulated pressure differential that would otherwise increase with any decrease in the outlet pressure. Travel of satellite vehicles or missiles into the upper atmosphere will therefore effect a prolongation of the operative life of instrumentation powered by the power supply of the present invention. It will of course be appreciated that the outlet of the fluid motor could alternatively be discharged into a low pressure chamber within the vehicle if so desired, and used to recharge the high pressure chamber 20 by pump equipment connected to the filler valve assembly during a recharging operation.

The prolonged and relatively slow release of pressure energy from chamber 20 and the relatively low operational speed of the fluid motor incident thereto requires efficient conversion of the motive energy so produced into electrical energy at a constant rate. The piezoelectric generator 34 is therefore used because of its constant output voltage characteristic for a given deformation of the piezoelectric elements therein and its lightweight and operational efficiency. However, piezoelectric generators heretofore utilized, were limited in output power because of the limitations on the operational frequency with which the piezoelectric elements are deformed to produce electrical energy. The specific generator 34 of the present invention is therefore peculiarly related to the disclosed installation because of its ability to produce an unexpectedly high power output despite the relatively low speed of the fluid motor 28 drivingly connected thereto in addition to the other attributes that make piezoelectric generators desirable for installations with which the present invention is concerned.

Referring now to FIGURE 2 in particular, it will be observed that the generator 34 is provided with a mounting frame 36 of any suitable construction so as to fixedly mount a plurality of piezoelectric units 38 equally spaced in radial relation to a rotational axis extending through a driven shaft 40. The shaft 40 is connected to an axially elongated driver cam element 42 journaled by the frame 36 for rotation about said rotational axis through shaft 40, as more clearly seen in FIGURE 4. Projecting radially from the driver cam 42 are a plurality of equally spaced lobes 44 as more clearly seen in FIGURE 3, the number of lobes being equal to the number of piezoelectric units 38. In the illustrated embodiment, eight sets of lobes and units are shown, it being appreciated that the number used will depend on the diameter of the driver cam 42, the thickness of the units 38 in relation to the circumferential spacing available about the driver cam and the power requirements of the installation. It is however essential that all of the units 38 be engaged simultaneously by the lobes 44 to deform and release all of the piezoelectric elements 46 therein, in phase with each other. It will also become apparent that each element 46 will be deformed and released each revolution of the driver cam a number of times equal to the number of lobes 44.

With continued reference to FIGURE 4 and FIGURES 5, 6 and 7, the unit 38 includes parallel frame members 48 interconnected by the radially outer frame member 50 to fix piezoelectric element 46 against angular displacement while guiding radial deformation thereof by the cam lobes 44. A non-conductive spacer 52 sleeves the edge portions of the element 46 received within the frame members to accommodate relative sliding movement due to deformation of the element. As more clearly seen in FIGURE 5, the elements 46 have radially inner surfaces 54 engaged by the lobes 44 for simultaneous maximum displacement to the position shown by solid line from an unpressurized release position shown by dotted line. Thus, maximum voltage is simultaneously generated in each element 46 and the charges so produced conducted from the terminal plates 56 and 58 formed by metallic or conductive coatings on the opposite sides of the element 46.

The elements 46 may be made of a material having the desirable piezoelectric properties such as a lead zirconate—lead titanate ceramic now available. Each of the elements will therefore produce a known charge at a relatively high frequency equal to the product of the number of lobes 44 and the rotational speed of the driver cam element 42. The piezoelectric elements will be radially deformed by the lobes 44 moving in a fixed circular path to the positions illustrated in FIGURE 5 at which point the linear movement of the lobes are in directions parallel to the engaging surfaces 54 and a predetermined maximum pressure hold on the elements for an instant producing a peak voltage. When the lobes are between the units 38 a zero voltage condition exists. The elements 46 are electrically interconnected in parallel through their terminal plates 56 and 58 as illustrated in FIGURE 8, so that a constant output voltage equal to that of each unit 38 appears across lines 60 and 62. Toward this end electrical leads 64 and 66 respectively connect the terminals 56 and 58 to the collector rings 68 and 70 fastened to the frame members of the units 38 as more clearly seen in FIGURE 4. The collector rings are therefore electrically connected by the lines 60 and 62 to a filter and rectifier circuit 72 such as that disclosed in my prior Patent No. 2,921,252 (FIGURE 8). A constant output voltage will therefore appear across the lines 26, with a current depending on the rotational speed of the fluid motor 28 and the number of units 38 in the generator 34. Regulation of the motor speed in accordance with the current in lines 26 is therefore effected by the governor 24 connected to the output lines 26 by lines 74.

From the foregoing description, the construction, operation and utility of the apparatus and system of the present invention will be apparent. It will therefore be apparent that a power supply is provided which is reliable, lightweight and operative for a prolonged period of time. Also the power supply does not form any noxious waste products presenting a disposal problem and operates under low temperature conditions.

I claim:

1. In a system for converting stored energy into electrical energy, a driver having a plurality of equally spaced lobes projecting therefrom, means mounting said driver for movement of said lobes in a fixed path, a plurality of piezoelectric elements equal in number to said plurality of spaced lobes having pressure surfaces simultaneously engaged and released by said lobes, means mounting said piezoelectric elements for holding each of said pressure surfaces thereof fixed against movement in a direction parallel to movement of each of said lobes when engaged therewith at the instant of maximum pressure, said pressure surfaces being fixedly spaced for simultaneous engagement and release by the lobes, and collector means operatively connecting to said piezoelectric elements in parallel for continuously conducting electrical current therefrom developed by said elements in response to movement of the driver.

2. A generator of electrical energy comprising; a driver cam having a plurality of equally spaced lobes radially projecting therefrom, a plurality of piezoelectric elements electrically connected in parallel engageable by each of said lobes, means fixedly mounting said piezoelectric elements for simultaneous deformation in a radial direction by said lobes, said piezoelectric elements being circumferentially spaced about the driver cam for simultaneous deformation thereby and rectifier means coupled to said piezoelectric elements.

3. In a system for converting stored energy into electrical energy, a generator comprising a rotatable driver, a plurality of piezoelectric elements connected in parallel and deformable by the driver to respectively generate a pulsating voltage, means mounting said piezoelectric elements for simultaneous maximum deformation by the driver at a frequency equal to the product of the number of said plurality of piezoelectric elements and the rotational speed of the driver and rectifier means coupled to said elements.

4. In a system for converting stored energy into electrical energy, a generator comprising; a rotatable driver, a plurality of piezoelectric elements deformable by the driver to respectively generate a pulsating voltage, means mounting said piezoelectric elements for simultaneous maximum deformation by the driver at a frequency equal to the product of the number of said plurality of piezoelectric elements and the rotational speed of the driver, means connecting said piezoelectric elements in parallel for conducting flow of current therefrom to a load, variable speed fluid motor means connected to said driver for rotation thereof, and means responsive to variations in said flow of current for regulating the speed of the motor means to maintain the power output of the generator substantially constant.

5. In combination with a stored source of energy, means for controlling the release of energy from said source, motor means driven by said release of energy, and a generator for producing a substantially constant output of electrical power comprising; a rotatable driver, a plurality of piezoelectric elements deformable by the driver to generate a pulsating voltage, means mounting said piezoelectric elements for simultaneous maximum deformation by the driver at a frequency equal to the product of the number of said plurality of piezoelectric elements and the rotational speed of the driver, means connecting in said piezoelectric elements in parallel for conducting flow of current therefrom to a load, variable speed motor means connected to said driver for rotation thereof, and means responsive to variations in said flow of current for regulating the speed of the motor means to maintain the power output of the generator substantially constant.

6. The combination of claim 5, including means for recharging said source.

7. A constant potential power supply for moving vehicles or the like comprising; a pressurized fluid storage chamber, valve means for regulating the release of fluid from said storage chamber, motor means driven by released fluid, a piezoelectric generator connected in driven relationship to said motor means for producing electrical power and including a plurality of piezoelectric elements electrically connected in parallel, and means coupled to said elements and responsive to variations in output current from said elements for controlling said valve means to regulate the speed of said motor means whereby said electrical power is maintained substantially constant.

8. The combination of claim 7 wherein said motor means comprises, a fluid motor having an inlet connected to said energy storage means through the regulating means and an outlet port, and discharge valve means connected to said outlet port for varying the pressure differential between the inlet and the outlet to control the speed of the motor means.

9. The combination of claim 8 wherein said regulating means comprises, flow restricting valve means operatively connecting the storage means to the inlet of said fluid motor for controlling the flow of fluid from the storage means, and current responsive governor means operatively connected to the flow restricting valve means for varying said flow of fluid.

10. The combination of claim 9 wherein said rechargeable storage means comprises, a fluid pressure storage chamber containing an inert gas under pressure, and filler valve means operatively connected to said chamber for recharging thereof with said inert gas.

11. The combination of claim 7 wherein said rechargeable storage means comprises, a fluid pressure storage chamber containing an inert gas under pressure, and filler valve means operatively connected to said chamber for recharging thereof with said inert gas.

12. In combination with a vehicle adapted for extended travel through a fluid medium having a variable ambient pressure, a prolonged life power supply for continuously operating loads within the vehicle comprising; a fluid pressure chamber mounted within said vehicle, filler valve means connected to said chamber and exposed externally of said vehicle for recharging said chamber with fluid under pressure, flow restricting valve means connected to said chamber for regulating outflow of fluid therefrom, a fluid motor having an inlet connected to said flow restricting valve means and an outlet, an electrical generator driven by said fluid motor to produce an output current varying with the speed of said fluid motor, means responsive to said output current for varying said fluid outflow through said flow restricting valve means, and discharge valve means connected to said outlet of the fluid motor for varying the discharge pressure therein with variations in the ambient pressure of the fluid medium.

13. The combination of claim 12 wherein said generator comprises; a driver connected to the fluid motor, a plurality of piezoelectric elements deformable by the driver to respectively generate a constant pulsating voltage, and means mounting said piezoelectric elements for simultaneous maximum deformation by the driver at a frequency equal to the product of the number of said plurality of piezoelectric elements and the rotational speed of the driver.

References Cited
UNITED STATES PATENTS

| | | | |
|---|---|---|---|
| 2,885,566 | 5/1959 | Sadler et al. | 307—57 |
| 3,101,420 | 8/1963 | Hufferd et al. | 310—8.7 |
| 3,168,660 | 2/1965 | Marks | 310—8.7 |
| 3,202,873 | 8/1965 | Feldman | 315—55 |
| 3,208,443 | 9/1965 | Hurwitz | 310—8.7 |
| 3,230,381 | 1/1966 | Grinnell et al. | 290—30 |

MILTON O. HIRSHFIELD, *Primary Examiner.*

J. D. MILLER, *Assistant Examiner.*